Oct. 6, 1942.    F. J. DEDRICK    2,298,041
METHOD OF MAKING DIES
Filed Jan. 28, 1941    2 Sheets-Sheet 1
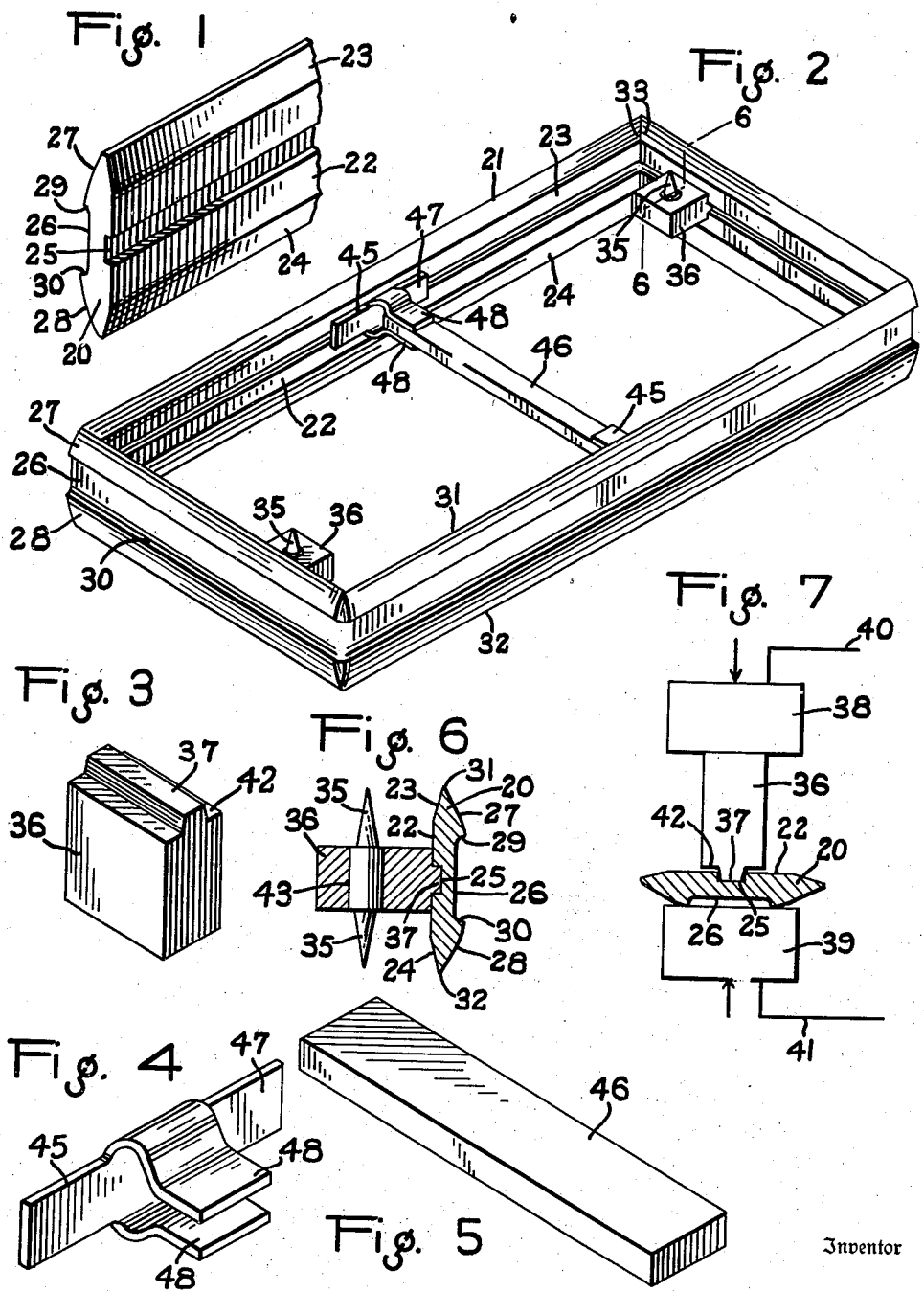
Inventor
F. J. DEDRICK
By Malcolm F. Barnett
Attorney

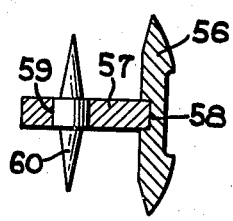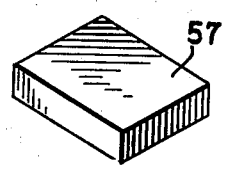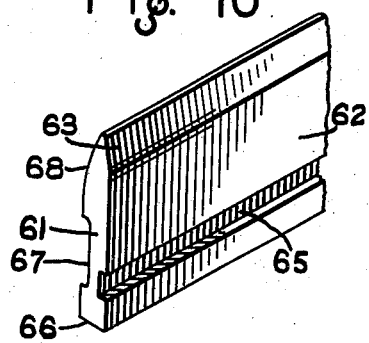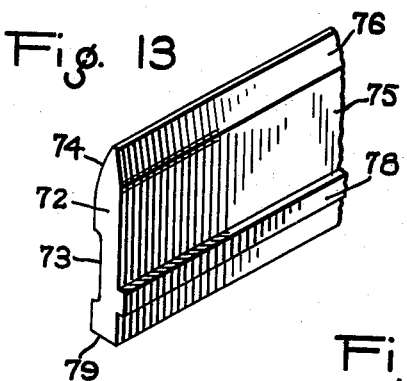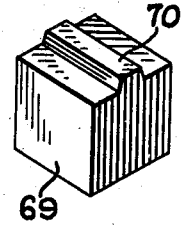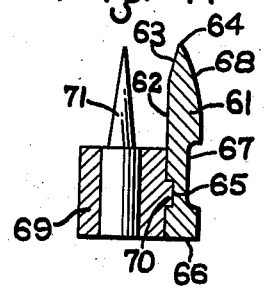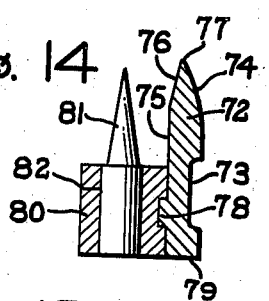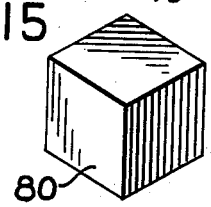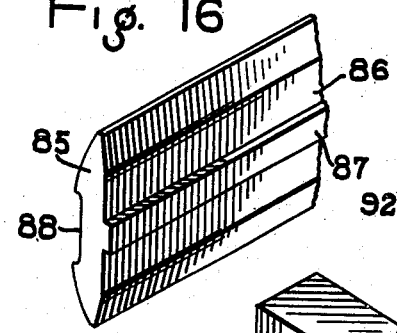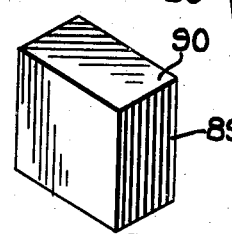

Patented Oct. 6, 1942

2,298,041

UNITED STATES PATENT OFFICE 2,298,041

METHOD OF MAKING DIES

Francis J. Dedrick, Red Lion, Pa.

Application January 28, 1941, Serial No. 376,257

7 Claims. (Cl. 76—107)

This invention relates to dies and to the method of making the same.

An object of the invention is to provide an improved method for making clicker dies from die stock having either a single cutting edge or double cutting edges.

Other objects of the invention will be readily apparent from the following description.

In the accompanying drawings:

Fig. 1 is a perspective view of a portion of one form of the improved preshaped die stock having double cutting edges;

Fig. 2 is a perspective view of a die formed from the preshaped die stock shown in Fig. 1;

Fig. 3 is a perspective view of one of the stab blocks shown in Fig. 2;

Fig. 4 is a perspective view of one of the cross brace brackets shown in Fig. 2;

Fig. 5 is a perspective view of one of the cross brace bars shown in Fig. 2;

Fig. 6 is a vertical transverse section taken on the line 6—6 of Fig. 2;

Fig. 7 is a sectional view showing the relation of the parts at the beginning of the welding process of affixing one of the stab blocks to the die stock;

Fig. 8 is a sectional view similar to Fig. 6 showing another form of stab block;

Fig. 9 is a perspective view of the stab block shown in Fig. 8;

Fig. 10 is a perspective view of a portion of another form of the improved preshaped die stock having a single cutting edge;

Fig. 11 is a sectional view similar to Fig. 6 showing a stab block mounted on the die stock of the form shown in Fig. 10;

Fig. 12 is a perspective view of the stab block shown in Fig. 11;

Fig. 13 is a perspective view of another form of preshaped die stock having a single cutting edge;

Fig. 14 is a sectional view similar to Fig. 11 showing a stab block mounted on the die stock of the form shown in Fig. 13;

Fig. 15 is a perspective view of the stab block shown in Fig. 14;

Fig. 16 is a perspective view of another form of preshaped die stock having double cutting edges;

Fig. 17 is a sectional view similar to Fig. 14 showing a stab block mounted on the die stock of the form shown in Fig. 16; and Fig. 18 is a perspective view of the stab block shown in Fig. 17.

Clicker dies have a recognized field for cutting out materials to a definite pattern. Therefore, the dies must be constructed of suitable material having characteristics by which the dies can be properly shaped. The material used in constructing clicker dies should be of small size and yet its outline must be of such accuracy that the handling must not deform the cutting edges or the pattern outline.

In order to produce clicker dies according to the present invention, it was first necessary to produce suitable material, that is to say, a suitable die stock. Preferably the die stock is cold drawn steel or cold rolled steel which is formed in strips so as to provide a die stock having definite characteristics. The steel used in forming the die stock may be what is known as "tool steel," or "alloy steel," having a large percentage of carbon and also having a high melting temperature. The steel should also be capable of being properly tempered so that sharp cutting edges can be ground thereon.

In addition to forming the clicker dies from die stock with the desired outline or configuration, in order to cut out materials to definite patterns, it has also been found advantageous to embody in the construction of the clicker dies added features for bracing the dies and also for marking the material during the die cutting operation.

Accordingly, the present invention concerns more particularly the manner by which well known forms of clicker dies can be manufactured in a better manner so as to withstand the hard uses to which clicker dies are subjected.

The invention will be successively described with several forms of die stocks.

One form of die stock is shown in Fig. 1 and comprises a bar adapted to be used in constructing what are known as double edged clicked dies.

The side of the stock 20, Fig. 1, used in forming the double edge die 21, Fig. 2, on the side constituting the inside of the frame, is formed with three angularly disposed flat sections, the intermediate section 22 being substantially vertically disposed and the other two sections 23, 24, being disposed at an angle to said vertical section 22 and being inclined outwardly towards the outer side wall of the frame.

The vertical section 22, on the side of the stock 20 constituting the inside of the frame is formed with a groove 25 having a suitable depth and height. The groove 25 is preferably located midway between the upper and lower edges of the die stock, and said groove may be formed in the stock when the latter material is being formed at the mill. The purpose of the groove 25 will be hereinafter more fully described.

The side of the stock 20 constituting the outer side of the frame of the die 21 is formed with three sections, the intermediate section 26 being in the form of a groove and the other two outside sections 27, 28 being curved or arcuate. The arcuate sections 27, 28 extend in opposite directions from the upper and lower edges of the intermediate section 26 towards the angularly disposed inner wall sections 23, 24, respectively. The construction is such that the intermediate section 26 constitutes a channel which is coextensive with the outside of the frame of the die 21.

The pairs of angularly disposed or tapered walls formed by the surfaces 23, 27 and 24, 28, respectively, provide edges along the top and bottom of the frame of the die 11, which edges are adapted to be ground in well known manner to provide sharp cutting edges, as shown in Fig. 2. In Fig. 1, the cutting edges are not shown unground since this view illustrates the die stock as it comes from the mill.

The channel section 26 which is formed on the outside of the stock includes an intermediate flat portion of a height approximately equal to one-third of the height of the die. At each end of the flat portion there are arcuate or curved portions 29 and 30, respectively, which curved portions merge with the surfaces 27, 28, respectively. By this construction there will not be any sharp edges or corners at the junction of the chanel 26 with the upper and lower arcuate portions 27, 28 of the die.

As shown in Fig. 1, in order that the die stock 20 will have great stability while in use, the stock is so formed as to provide a thickened structure at the portions of the die requiring reinforcement. However, in order to reduce the weight of the material as much as possible and at the same time provide a structure which will be rigid and which will retain its shape under the most severe conditions, it has been found by actual practice that the two channels 25 and 26 can be formed in the intermediate portion of the stock for the purposes to be hereinafter described. It will be noted that the contour of the stock 20 in cross section provides material from which the cutting edges 31, 32 (Figs. 2 and 6) can be readily formed by grinding both the outside and the inside peripheral surfaces of the frame. Also the body of metal on opposite sides of the channels 25 and 26 is considerably heavier than at the central body portion and this assures adequate strength for the cutting edges. The straightening of the die is more readily accomplished with this relatively thinner central body as compared to the former constructions of dies. The reduced section or channel 26 is not only highly advantageous in making straightening easier, but in use, it permits the operator to grasp the die in order to transfer the same from one material to another. The body portion or stock constructed in the above manner becomes a definite limit to any tendency of fatigue cracks or spread. It also facilitates accurate joining of the edges of the die during the welding step.

The die stock 20 when preshaped in the above manner is bent to the desired outline to form the die and the abutting ends 33, Fig. 2, are welded. The weld at the ends 33 is then filed to remove surplus welding material.

The pattern to which a die is formed may have any configuration. In Fig. 2 I have shown a clicker die of rectangular form. However, it will be understood that the present invention is also applicable to dies of other shapes and sizes.

Frequently, it is necessary to mark the blank material cut out by a die. When such marks are in the nature of perforations, holes, slits, or the like, which may be located at some point adjacent to the edges of the cut out material, suitable means may be embodied in the construction of the die so that such marks can be cut into the material during the operation of the die in the clicker press.

For instance, assuming that it is desired to form a hole in the material, then the die can be constructed with a suitable implement for forming the hole in the material simultaneously with the dieing operation.

In Fig. 2 there is shown a die constructed with a plurality of implements for forming holes in the material to be cut out by the die. The implements are arranged around the inside of the frame 21 at the desired points, and in the embodiment of the invention shown, each implement comprises a pin or prong 35 mounted in a block 36. The block 36 is adapted to be securely fastened to the die so that when the die is operated the pin or prong 35 will not be dislocated or otherwise moved out of its set position.

Also, in the case of dies which may be somewhat elongated in form, it may be advantageous to construct the dies with suitable braces.

One form of brace is shown in Fig. 2 and comprises a pair of brackets 45 and a bar 46 extending between the brackets 45.

If so desired, the same method may be used for fastening the blocks 36 to the die stock, also for fastening the bars 46 to the brackets 45 and for fastening the brackets 45 to the die stock.

Since the material used in forming the die stock 20 is preferably alloy steel having a high melting or fusing temperature, in order that the blocks 36 and the brackets 45 may be readily secured to the die stock, it is preferable to construct such elements from soft steel.

As shown in Fig. 3, the blocks 36 may be somewhat rectangular in form, and a face of each block may be formed with a rib 37 of such dimensions that said rib can be inserted into the groove 25 at the beginning of the welding operation.

In the process of fastening the block 36 to the die stock 20, the block is first positioned on the die at the desired point, and then the parts are arranged, as shown in Fig. 7, between two electrodes 38 and 39.

The electrode 38 is adapted to be supplied in the usual manner with electric current by a conductor 40 leading from a suitable source of supply.

The electrode 39 constitutes the other pole of the circuit and has connected thereto a conductor 41.

The parts are put under suitable pressure, as indicated by the arrows, Fig. 7, for insuring adhesion.

Since the block 36 is formed of soft steel, the heat produced by the electric current passing through the block and the die stock will soften the rib 37 first to such an extent that the block is fused to the die stock, and this fusing occurs without deforming the die stock, since the latter metal is not heated to a sufficiently high temperature to become soft at the time the softer metal of the block 36 is heated to the proper welding temperature.

By comparing Fig. 6 with Fig. 7, it will be noted that during the welding operation, as the soft metal of the rib 37 softens, the surplus soft metal flows into the groove 25 and the pressure maintained during the welding operation forces the face 42 of the block 36 tightly against the flat face provided by the intermediate section 22 of the die stock 20. The welding pressure is maintained for a length of time sufficient to effectively connect the block 36 with the die stock. Since no extra metal is added during the welding operation, the welded joint between the block and the die stock will be clear, as shown in Figs. 2 and 6.

After the block 36 has been mounted on the die, a hole 43 is formed therein for the double pointed pin 35. The pin 35 may be secured in position in the block 36 in any desired manner and the pointed ends thereof may be sharpened during the final operations of completing the construction of the die. Since the pin 35 is not adapted to be mounted in the block until after the block has been mounted on the die, the pin can be accurately positioned at the desired point of the pattern. With the pin 35 mounted in the block 36 as has been described, this portion of the die becomes known as a stab block.

The brace 46 may, as shown in Figs. 2 and 5, consist of a rectangular bar of metal, preferably formed from soft steel. The bar should have a length slightly less than the distance between the two sides of the frame of the die which are to be braced.

The bracket 45, which is also formed of soft steel, may be constructed from a suitable blank of comparatively thin metal, so as to provide an elongated body portion 47 and two limbs or arms 48 which extend laterally from the body 47. The arms 48, preferably should be so formed as to provide a pair of members which are spaced apart a distance sufficiently to receive an end portion of the bar 46.

The bracket 45 may be welded to the die stock by the pressure electric welding method heretofore described, and shown in Fig. 7, and the end portions of the bar 46 may likewise be welded to the arms 48 of the bracket 45. The brace thus formed will be suitable for its intended purpose of retaining the parts in the proper position.

After the die has been thus formed it is straightened, tempered or hardened, and then the edges 31 and 32 are sharpened.

In the form of the invention shown in Fig. 8, the die stock 56 is similar in all respects to the die stock 20. However, a block 57 is used which is much smaller in size, as compared to the stab block 36. The block 57 is preferably rectangular in outline and may be constructed from soft metal having a thickness not greater than the width of the slot or groove 58. In connecting the block 57 to the die, one edge of the block is inserted in the groove 58. The parts are then welded by the same method shown in Fig. 7, so as to fuse the edge portion of the block with the die stock. After the block 57 has been welded to the die, it is formed with an opening 59 for a double pointed stab pin 60.

Figs. 10, 11 and 12 show the invention applied to what is known as a single edge die stock.

The die stock 61 has on the inside a vertical surface 62 and an inclined plane peripheral surface 63 which extends from the vertical surface 62 towards the cutting edge 64.

The inside surface of the die stock 61 is also formed with a groove 65 which corresponds to the groove 25 of the die stock 20. However, instead of being located midway of the die stock as is the groove 25, the groove 65 is located adjacent the edge 66 of the die stock 61.

The outside of the die stock 61 has a channel formed by the groove 67. The channel 67 is similar in form to the channel 26 of the die stock 20. However, the channel 67 is located nearer to the edge 66 of the die stock 61 than it is to the inclined surface 63.

As shown in Figs. 10 and 11, extending from the upper portion of the channel 67 is a convex surface 68 which is so disposed as to intersect the top of the inclined plane peripheral surface 63 so as to form the edge 64, which edge is adapted to be ground in well known manner to provide a sharp cutting edge. The radius of curvature of the surface 68 should be such as to provide with the surface 63 a gradually tapered body for the die leading from the thickest part of the die above the channel 67 towards the cutting edge 64.

The stab block 69 used with the die stock 61 may comprise a rectangular body of soft steel formed on one side with a rib 70, which rib is adapted to be mounted in the groove 65.

The stab block 69 may be welded to the die stock 61 in the manner heretofore described and illustrated in Fig. 7, after which operation the block 69 has a pin 71 mounted therein.

The stab block 69 may be of such size that, when said block is welded to the die stock, the bottom surface thereof will be substantially flush with the thick blunt edge portion 66 of the die stock 61, as shown in Fig. 11. The pin 71 extends from the block 69 towards the cutting edge 64.

In the form of the invention shown in Figs. 13, 14 and 15, the die stock 72 has the outside surface formed of the same contour as the die stock 61 to provide a channel 73, and the convex surface 74. The inside surface of the die stock 72 is formed with the vertical surface 75 and the inclined plane peripheral surface 76 which is so disposed as to intersect the top of the convex surface 74 so as to form the cutting edge 77.

In lieu of the groove or slot 65, the die stock 72 is formed with a rib 78. This rib is arranged longitudinally with respect to the blunt edge portion 79 of the die stock and is coextensive therewith.

The stab block 80 adapted to be mounted on the die stock 72 comprises a rectangular piece of soft steel formed, as shown in Fig. 15, with six plane surfaces.

During the welding operation, the block 80 is mounted on the die stock 72 in the manner heretofore described and shown in Fig. 7. The parts are then put under pressure, and as fusion occurs at the point where the block engages the rib 78, the surplus soft metal of the block is extruded at each side of the rib. Sufficient pressure is maintained to force the block into intimate contact with the surface 75 of the die, as shown in Fig. 14. In this way the parts will be firmly united to provide a homogenous structure.

After the block 80 has thus been mounted on the die, a single pointed pin 81 can be mounted in an opening 82 therein in the manner heretofore described.

Figs. 16, 17 and 18 illustrate the manner in which a double edged die stock 85 is adapted to have mounted thereon a plane surfaced stab block.

In this form of the invention the side 86 of the stock constituting the inside of the die is formed with a rib 87 which is diametrically disposed with respect to the channel 88 on the outside of the die stock. In all other respects the die stock 85 may be similar in construction to the die stock shown in Fig. 1.

The stab block 89, Fig. 18, is rectangular in form and has six plane surfaces.

When the block is to be mounted on the die stock 85, one of the surfaces thereof, such as the surface 90, Fig. 18, is arranged against the rib 87 in parallel relation to said rib. The parts are then welded together in the manner heretofore described and the block 89 will be connected to the die stock 85 in a similar manner to the way the block 89 is welded to the die stock 72.

After the block 89 has been welded to the die stock 85, a double pointed pin 90 can be mounted in an opening 91 formed in the block in the manner heretofore described.

It will be noted that each of the die stocks 56, 61, 72 and 85 are adapted to be formed of alloy tool steel and are also adapted to be formed into the desired shaped frames preparatory to having the stab blocks mounted thereon.

In actual practice it has been found that by first preshaping the die stocks in the manner hereinabove described, and then electrically welding the stab blocks and other parts to the frames, after the frames have been formed, I am able to produce clicker dies at a greater rate of speed than by the previously known methods. Heretofore, when acetylene torches were used during the welding operation, the method was much slower compared to the new method of the present invention. When acetylene torches are used during the welding operation, the die stocks are often injured, due to the extreme high temperature of the acetylene flame. On the other hand, by the present electric pressure welding method the amount of temperature can be accurately controlled and, therefore, the die stock is not subjected to unnecessary heat. In this way the dies are produced much faster and with more accuracy than by any previously known method.

Experience in producing the clicker dies by the method of the present invention has been that by the methods shown in Figs. 13 to 18 inclusive, the total cost of each die is somewhat less than when the dies are produced by the forms of the invention shown in Figs. 1 to 12 inclusive. However, there is so little difference between the two methods, that is to say, the method in which the die stock is formed with a groove to receive the fused portion of a stab block or bracket, or the other method in which the die stock is formed with a rib, that both methods answer the same purpose insofar as the strength and durability in the life of the clicker die is concerned. Furthermore, experiments have proven that it is immaterial where the blocks or similar parts are mounted on the die stock. Such parts may be positioned at any place on the body of the die without affecting the proper functioning of the die, since the alloy steel used in forming the die stock is not injured during the welding operation.

Having thus described my invention, what I claim is:

1. The method of making clicker dies, which consists in forming the die stock with a longitudinal cutting edge, forming a channel longitudinally in one face of said die stock, forming a groove longitudinally in the face of the die stock opposite to the channeled face, bending said die stock to clicker die shape with said groove on the inside thereof and welding the adjacent ends together, inserting a block of metal having an area less than the area of the die and having a thickness corresponding substantially to the thickness of said groove into the groove and uniting said block to the die stock by welding, and finally mounting a pin in said block at the point desired.

2. The method of making clicker dies, which consists in forming die stock from hard steel with longitudinal oppositely disposed cutting edge portions, forming a channel longitudinally in one face of the die stock, forming a rib centered with respect to the channel and having a breadth less than the breadth of the channel longitudinally of the die stock on the face opposite to the channeled face, bending said stock to clicker die shape with the rib on the inside of the die and welding the adjacent ends of the die together, placing a block of soft steel on said rib and applying electric welding pressure to fuse the block into intimate contact with the face of the die, alining and straightening the die to conform with a pattern, mounting a pin in said block at the point desired, tempering the die, and grinding the cutting edges to the desired sharpness.

3. The method of making clicker dies, which consists in forming a longitudinal channel in one face of the die stock, forming a groove longitudinally in the face of the die stock opposite to the channeled face, bending said stock to clicker die shape with the grooved face on the inside of the die, mounting a small block of metal with a projection thereon in said groove, and connecting the block to the die by welding.

4. The method of making clicker dies, which consists in forming the die stock with longitudinal oppositely disposed cutting edge portions, forming a channel longitudinally on one face of the die stock, forming a groove centered with respect to the channel and having a height less than the height of the channel longitudinally of the die stock in the face opposite to the channeled face, bending said stock to clicker die shape with the groove on the inside of the die, placing a block of metal against the grooved portion of said die and welding the two together, alining and straightening the die to conform with a pattern, mounting a pin in said block at the point desired, tempering the die, and grinding the cutting edges to the desired sharpness.

5. The method of making clicker dies, which consists in forming the die stock with oppositely disposed longitudinal cutting edges, forming a channel longitudinally in one face of the die stock, forming a groove centered with respect to the channel and having a height less than the height of the channel longitudinally in the face of the die stock opposite to the channeled face, bending said die stock to clicker die shape with said groove on the inside thereof and welding the adjacent ends together, inserting edges of a plurality of blocks of metal into the groove at intervals around the die, and uniting said blocks to the die by welding.

6. The method of making clicker dies, which consists in forming die stock with longitudinal cutting edge portions, forming a channel longitudinally in one face of the die stock, forming a groove centered with respect to the channel and having a height less than the height of the channel longitudinally of the die stock on the face opposite to the channeled face, bending said stock to clicker die shape with the groove on the inside of the die, and welding the adjacent ends of the stock together.

7. The method of making clicker dies, which consists in forming die stock with a longitudinal cutting edge, forming an arcuate channel longitudinally in one face of the die stock, forming a substantially rectangular groove centered with respect to the channel and having a height less than the height of the channel longitudinally of the die stock in the face opposite to the channeled face, bending a length of said die stock to clicker die shape with the groove on the inside of the die, and uniting the abutting ends of the stock together.

FRANCIS J. DEDRICK.